(12) United States Patent
Kölker et al.

(10) Patent No.: US 7,125,210 B2
(45) Date of Patent: Oct. 24, 2006

(54) FACE MILLING CUTTER

(75) Inventors: Werner Kölker, Ratzeburg (DE); Olaf Rohr, Sahms (DE); Uwe Schunk, Lübeck (DE)

(73) Assignee: Fette GmbH, Schwarzenbek (DE)

( * ) Notice: Subject to any disclaimer, the term of this patent is extended or adjusted under 35 U.S.C. 154(b) by 0 days.

(21) Appl. No.: 10/890,328

(22) Filed: Jul. 12, 2004

(65) Prior Publication Data

US 2005/0025584 A1 Feb. 3, 2005

(30) Foreign Application Priority Data

Jul. 12, 2003 (DE) .......................... 203 10 713 U

(51) Int. Cl.
*B23C 1/00* (2006.01)
(52) U.S. Cl. .................. 409/234; 407/34; 407/54; 408/227
(58) Field of Classification Search .................. 407/54, 407/40, 42, 34, 53, 64, 65; 408/228, 227; 409/234
See application file for complete search history.

(56) References Cited

U.S. PATENT DOCUMENTS

| | | | | |
|---|---|---|---|---|
| 4,251,172 A * | 2/1981 | Durand | ........................ | 408/228 |
| 4,934,881 A * | 6/1990 | Tsujimura et al. | ............ | 407/42 |
| 5,964,555 A * | 10/1999 | Strand | ........................ | 408/228 |
| 6,158,927 A * | 12/2000 | Cole et al. | ..................... | 407/48 |
| 6,582,165 B1 * | 6/2003 | Baba | ........................ | 408/233 |

FOREIGN PATENT DOCUMENTS

DE  100 52 963 A1  5/2002

* cited by examiner

*Primary Examiner*—Willmon Fridie, Jr.
(74) *Attorney, Agent, or Firm*—Vidas,Arrett&Steinkraus

(57) ABSTRACT

Face milling cutter with a shaft section and a tool section, whereby the front end of the tool section has at least one flat, arched, lower cutting edge, a rounded corner cutting edge, and a peripheral cutting edge, whereby the lower cutting edge has a radius r1 from 1 to 2 times d1 and begins at a distance of 0.1 to 0.2 d1 to the axis of the shaft section, whereby d1 is the diameter of the flight circle of the axially parallel tangent to the rounded corner cutting edge.

14 Claims, 3 Drawing Sheets

FACE MILLING CUTTER

FIELD OF THE INVENTION

The invention relates to a face milling cutter. The invention relates in particular to a face milling cutter for roughing work, e.g. in mold and die production.

BACKGROUND OF THE INVENTION

A face milling cutter of the initially named type is also known from DE 100 52 963 A1. It has a shaft that accommodates cutting plates in the front area in the circumferential direction of spaced pockets. Each cutting plate has three cutting-edge sections that are engaged with the component. An arched lower cutting edge that merges into a corner-cutting edge towards the perimeter is provided on the forehead end On its part. It merges into a peripheral cutting edge that lies back in an angle for the creation of a flank. With the face milling cutter, a high feed rate is to be achieved for the smoothest possible tool surfaces.

SUMMARY OF THE INVENTION

The object of the invention is to create a face milling cutter that enables a high feed rate with a high removal rate and with little stress on the individual cutting edges.

The face milling cutter according to the invention is especially suited for roughing work in the field of mold and die production. Shaft section and tool section can be formed from one piece of carbide. Alternatively, the cutting edges can be formed on a separate die plate, which is attached to the tool shaft in a detachable manner. The tool section has at least one lower cutting edge, one corner cutting edge attached to this, as well as a peripheral cutting edge. Corresponding cutting edges are preferably provided in a diametrically opposed manner.

The lower cutting edge of the invention has a radius from 1 to 2 times a diameter $d_1$, and the distance of the lower cutting edge from the axis of the shaft is approx. 0.1 to 0.2 times the diameter $d_1$, whereby the diameter $d_1$ is the diameter of the flight circle, which describes a tangent axially parallel on the rounded corner cutting edge.

Due to the very large radius of the face cutting edge, a flat section bow with correspondingly small kappa values (setting angle) engages with the component. This lowers the cutting force and thus the stress on the individual cutting edge sections, which in turn enables a higher feed rate and thereby higher removal rates (volume of chips).

According to one embodiment of the invention, the separation distance of the tangent point of the mentioned tangent from a second tangent to the front cutting edge perpendicular to the shaft axis is between 0.08 and 0.12 times the diameter $d_1$. According to another embodiment of the invention, the maximum delivery depth ap is preferably 0.05 $d_1$, i.e. of the already mentioned diameter. The radius of the corner cutting edge is preferably 0.05 to 0.07 $d_1$. Only a short section of the corner cutting edge thereby engages with the tool so that the stress is minimized in this area.

The peripheral cutting edge is, in cross-section, preferably a straight line, which recoils around a predetermined clearance angle. Thus, it does not cut when moving over the delivery depth.

If, according to a further embodiment of the invention, the center of the circular arc for the front cutting edge has a lateral separation distance from the shaft axis of approx. 0.1 to 0.2 $d_1$, then an area appears in the center of the front side of the milling cutter that does not function during the chip removal.

In the end view, the lower or front cutting edges are bent in an arched manner and, as seen in the rotational direction, towards the back. The hereby created aperture angle of the front cutting edges is preferably 15°.

Since overloading the tool can easily lead to a break, it is provided according to an embodiment of the invention that the shaft section has a predetermined breaking point that is tapered in diameter.

In order to also allow for the option of hard processing, a further embodiment of the invention suggests that the lower cutting edge and the corner cutting edge are formed on a cutting element made of a super-hard cutting material, which is attached to the tool shaft by hard solders. An example of such a super-hard cutting material is CBN or PKD.

As initially mentioned, the milling cutter according to the invention can be provided with a one-piece shaft tool made of a suitable material. Alternatively, according to the invention, a plate can be provided, on which the cutting edges are formed and which is attached to the shaft with the help of suitable materials. For example, the shaft can have a diametrical slit on the front end, in which the tool plate is suitably accommodated. The shaft has a transverse bore hole and the tool plate has a hole so that the tool plate is fastened in the slit of the shaft by a bolt, which passes through the shaft and the plate. The fastening is preferably such that the front surface of the plate, which lies opposite the blades, is pressed tightly against a seat of the slit when the bolt, preferably a fitting bolt, is tightened. A tool plate has the advantage that it can be exchanged after it wears out, while the shaft can be used for another tool plate. This especially saves cutting material. The tool plate can e.g. be made of cemented carbide or a super-hard metal, while the shaft is made of a suitable steel. Finally, it is also possible to use a first material to make the plate, whereby the cutting edges are formed by an insert that is soldered the tool plate.

As already mentioned, the tool according to the invention enables high cog feeds as a result of small depths of cut. The cutting force is reduced and thereby the stress on the individual cutting edge sections as well. On the other hand, the goal is a high feed rate with high removal rates.

Exemplary embodiments of the invention are explained in greater detail below using drawings.

DETAILED DESCRIPTION OF THE PREFERRED EMBODIMENTS

In FIGS. 1 through 4, the face milling cutter is generally labelled with 10. It is formed of one piece of cemented carbide and has a tool section 12 as well as a shaft section 14, which is only partially illustrated. The shaft section is designed for clamped support in the chuck of a machine tool. A reduced-in-diameter junction 16 is formed between the tool section 12 and the shaft section 14. A predetermined breaking point 17, which becomes effective once a certain load is exceeded, is provided in the shaft section.

Figure 3:
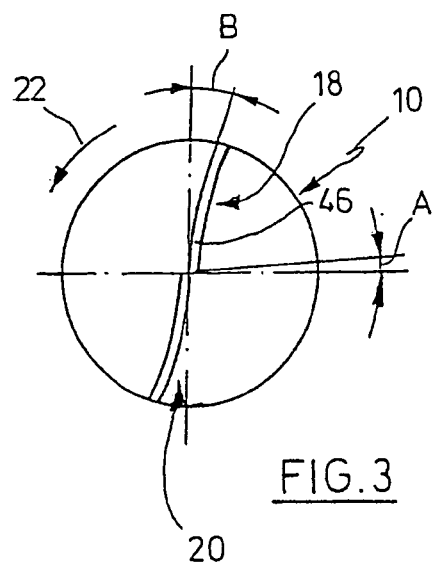
FIG. 3 shows a front view of the face milling cutter according to FIG. 1 or 2.

As can be seen in particular from FIG. 3, diametrically opposed blades 18, 20 are formed that are bent backwards opposite the rotational direction indicated with 22, with an aperture angle B of approx. 15°. The formation of the blade geometry is to be explained in greater detail below based on FIG. 4. Only blade 18 is referred to here. The blade 20 is designed identically.

The blade 18 consists of a lower cutting edge or front cutting edge (24), a corner cutting edge 26, and a peripheral cutting edge 28. The latter is straight in cross-section and recedes by a clearance angle a with respect to a tangent (30) on the circular corner cutting edge 26. The tangent 30 describes a flight circle with a diameter d1, to which all other measurements given below refer. The cutting edge 24 is formed with a radius from 1 to 2 times d1. In this specific case, the radius r1=1.5 times d1. The center of the circular arc lies shifted opposite the tool axis 28a, as it were, by a magnitude of 0.2 to 0.4 times d1. In this specific case, this separation distance a1 is 0.125 times d1. In this specific case, the radius of the corner cutting edge (26) is r1=0.066 times d1. The separation distance of the tangent point 34 on the corner cutting edge 26 to the tangent 36 on the front cutting edge 18 perpendicular to the shaft axis (28a) is 0.08 to 0.12 d1, 0.1 times d1 in this specific case.

As can be seen, the effective front cutting edge (24) begins in separation distance a1 in point 38. The edge 24 extends inwards to shaft axis 28a and thereby no longer contributes to the chip removal. A slight depression 40 can even be seen in the middle.

Figure 4:
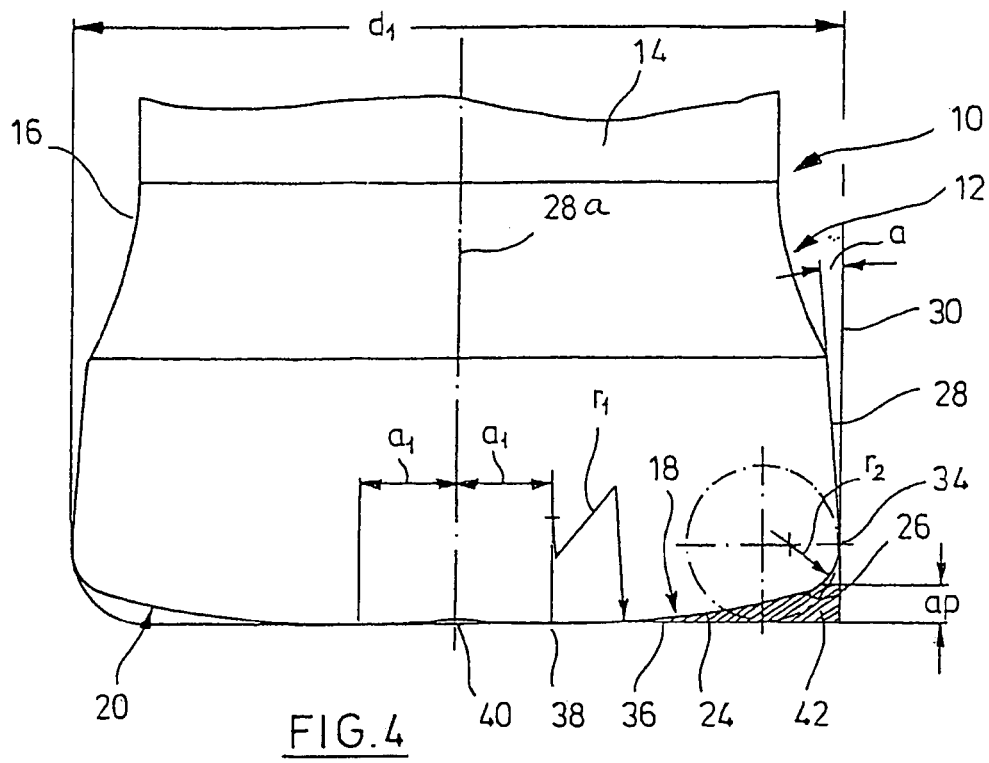
FIG. 4 shows an enlarged lateral view of the face milling cutter according to the invention.

FIG. 4 shows the contact with a hatched tool section, as can be seen with 42. It can be seen that the depth of cut ap is relatively small, in this specific case 0.05 times d1. Only a small part of the corner cutting edge 26 thus contributes to the removal. The front cutting edge 24 is very flat so that a very small kappa (setting angle) is obtained with a correspondingly low load on the cutting edge.

Figure 5:
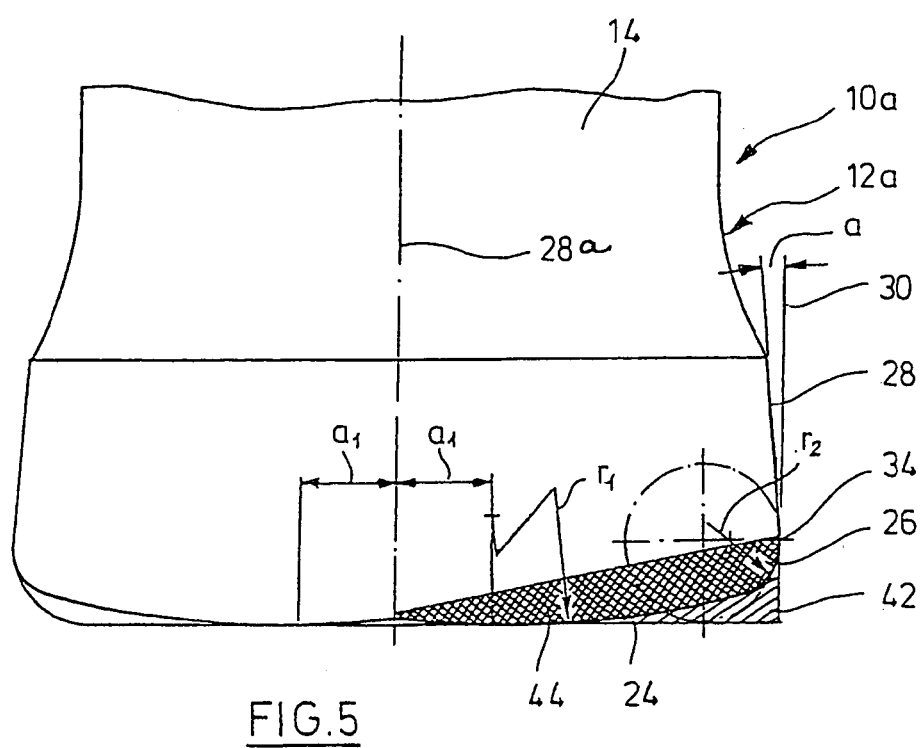
FIG. 5 shows a lateral view of a modified embodiment of the face milling cutter according to the invention.

In the embodiment according to FIG. 5, the face milling cutter 10a is provided with almost the same geometric properties as in FIGS. 1 through 4. The same parts are thus provided with the same reference numbers. The difference compared to FIG. 4 consists in that blade elements 44 are soldered in pockets for the formation of the blades 18, 20 (only element 44 is shown in FIG. 5). It consists of a super-hard material, e.g. CBN or PKD. But nothing is changed with respect to the geometry of the blade.

Figure 1:
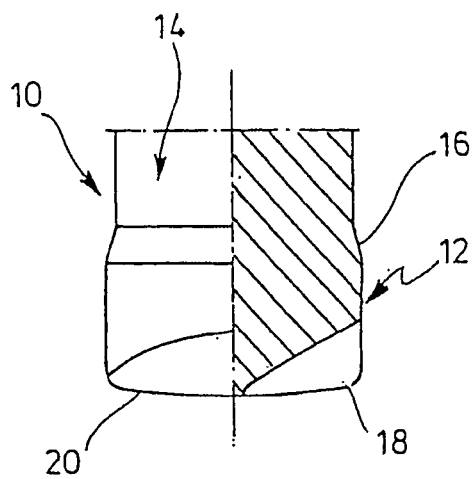
FIG. 1 shows a lateral view and a cross-section of a face milling cutter according to the invention.
Figure 1A:
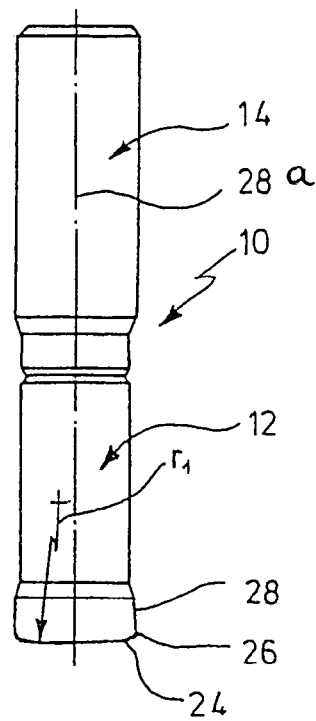
FIG. 1A shows the entire lateral view of the face milling cutter according to FIG. 1.

FIGS. 1 and 3 show that the blades 18, 20 in the area of the front cutting edge 24 have a front bevel 46, e.g. with a width of 0.8 mm. The front rake angle, labelled with C, is e.g. 6°. A first clearance angle D is e.g. 8° and a second front clearance angle E is e.g. 16°. The width of the front bevel is shown with F.

Figure 2:
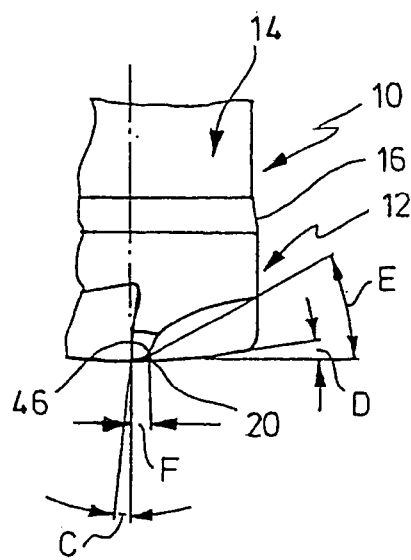
FIG. 2 shows a lateral view of the face milling device, rotated 90° vis-à-vis FIG. 1, according to FIG. 1.
Figure 2A:
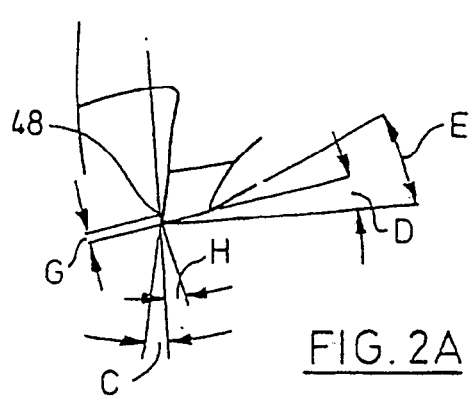
FIG. 2A shows a lateral and enlarged view of the proportions on the lower cutting edge.

FIG. 2A shows that the cutting edge 24 has a protective bevel 48 (edge break). The resulting bevel angle H is 10° to 18°, preferably 14°. The bevel width G is 0.06 to 0.12 mm, preferably 0.08 mm. While the rake angle C is positive, a negative rake angle is created by the edge break in the lower area of the main blade. Bevel angle and width can be freely selected for different application (materials).

Figure 6:
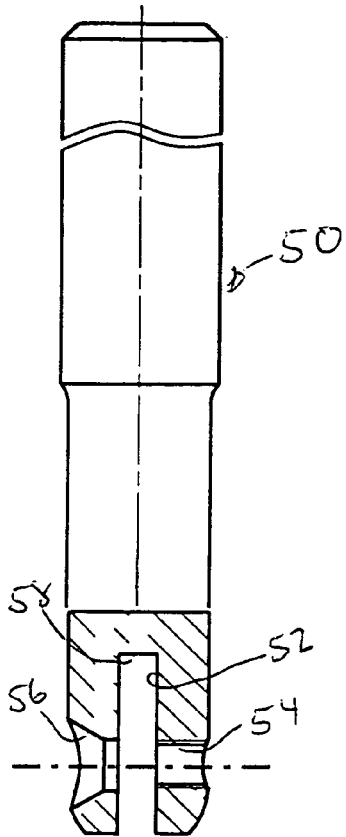
FIG. 6 shows the lateral view, partially in cross-section, of a shaft for a different embodiment of a face milling cutter according to the invention.

FIG. 6 shows a circular cross-section of a tool shaft 50 that has an intake slit 52 with a rectangular cross-section on the lower end, which is fed diametrically and open to the end. The lower section of the tool shaft 5 shown in cross-section also has a threaded hole 54 that runs radial and transverses the slit 52. A conical expansion 56 is provided on the left end for the head of a not-shown clamping bolt, the threaded shaft of which works together with the threading of the threaded hole 54. The slit 52 forms a seat 58 in its base.

Figure 7:
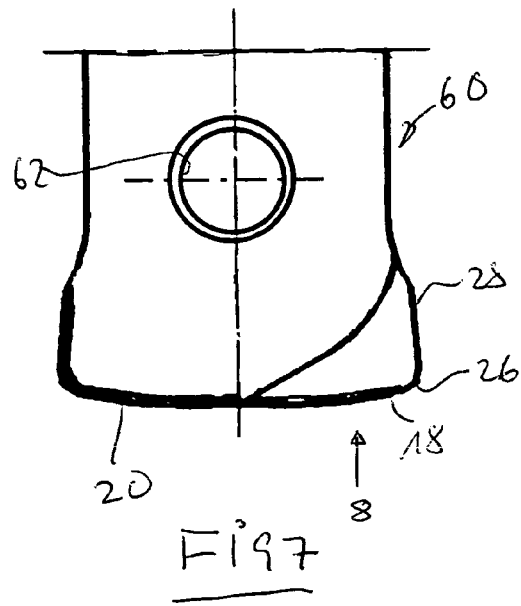
FIG. 7 shows an enlarged view of a tool plate to be accommodated in the shaft in accordance with FIG. 6.
Figure 8:
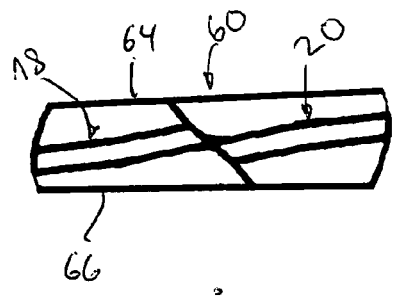
FIG. 8 shows an end view of the tool plate in accordance with FIG. 7 in the direction of arrow 8.

FIGS. 7 and 8 show a tool plate 60, which can be suitably accommodated by slit 52. The tool plate has the same blade geometry as was described in detail based on FIGS. 1 through 5. Thus, the same parts are provided with the same reference numbers. However, they are no longer described individually. The tool plate 60 has a hole 62 that is aligned approximately with the threaded hole 54 when the tool plate 60 is inserted into the slit 52. The front end of the tool plate 60 located opposite the blades 18, 20 and that is not shown in FIG. 7 thereby lies against the seat 58 of the slit 52. The threaded hole 54 and the hole 62 are such that when tightening the clamping screw, which is formed from a fitting bolt, the tool plate 60 is pulled into the slit 52, so that the turned front side of the tool plate 60 is pressed against the seat 58. This ensures that the tool plate 60 is centered in the shaft 52, through which the precision, which is demanded of this type of tool, is adhered to.

FIG. 8 shows that the tool plate 60 has two opposite-lying flat sides 64, 66, which abut against the lateral walls of the slit 52.

The invention claimed is:

1. A face milling cutter with a shaft section having a longitudinal axis and a tool section axially mounted to the shaft section, the front end of the tool section having at least one flat, arched, lower cutting edge (24) having a radius, the lower cutting edge joining to a rounded corner cutting edge, and a peripheral straight cutting edge being provided at the periphery of the tool section, the lower cutting edge having a radius r1 of 1 to 2 times of d1 wherein d1 is the diameter of the flight circle of the axially parallel tangent to the rounded corner cutting edge, the beginning of said radius r1 being offset from said longitudinal axis 0.1 to 0.2 times d1, characterized in that the separation distance of the tangent point (34) of the tangent (30) from a second tangent (36) to the lower cutting edge (24) perpendicular to the shaft axis (28a) is between 0.08 and 0.12 d1; the center of the circular arc of the lower cutting edge (24) has a separation distance of $a^1$ from 0.1 to 0.2 d1 from the shaft axis (28); and the radius r2 of the corner cutting edge (26) is 0.05 to 0.07 d1 and wherein the straight peripheral cutting edge (28) above the tangent point (34) recoils around a predetermined clearance angle a.

2. The face milling cutter according to claim 1, characterized in that the maximum delivery depth ap is approx. 0.05 d1.

3. The face milling cutter according to claim 1, characterized in that the radius r2 of the corner cutting edge (26) is 0.05 to 0.07 d1.

4. The face milling cutter according to claim 2, characterized in that only approximately one-forth to one-third of the corner cutting edge (26) contributes to the delivery depth ap.

5. The face milling cutter according to claim 1, characterized in that the lower cutting edge (24) is bent backwards with respect to the circumferential direction (22) as seen from the front.

6. The face milling cutter according to claim 5, characterized in that the aperture angle B of the lower cutting edge (24) is approximately 15°.

7. The face milling cutter according to claim 1, characterized in that the shaft section (14) has a predetermined breaking point (17) with a tapered diameter.

8. The face milling cutter according to claim 1, characterized in that the lower cutting edge (24) and the corning cutting edge (26) are formed on a blade element (44) made of a super-hard cutting material, which is attached to the tool section (12) through hard soldering.

9. The face milling cutter according to claim 1, characterized in that the lower cutting edge (24) has a bevel (48).

10. The face milling cutter according to claim 9, characterized in that the bevel angle H is 10° to 18° and the bevel width is 0.06 to 0.12 mm.

11. The face milling cutter according to claim 1, characterized in that the shaft section (14) and the tool section (12, 12a) are made of one piece.

12. The face milling cutter according to claim 1, characterized in that the cutting edges (18, 20) are formed on a tool plate (60), which can be attached to the shaft section (50) in a detachable manner.

13. The face milling cutter according to claim 12, characterized in that the end of shaft section (50) has a diametrically continuous slit (52), in which the tool plate (60) is suitably accommodated, whereby the front surface of the tool plate (60) opposite the cutting edges (18, 20) works together with a seat (58) of the slit (52) and the tool plate (60) by means of a bolt on the shaft section (50).

14. The face milling cutter according to claim 13, characterized in that a fitting bolt is provided that works together with a hole (62) of the tool plate (60) such that the tool plate (60) is pressed against the seat (58) when the fitting bold is tightened.

* * * * *